(12) United States Patent
Kulangara

(10) Patent No.: US 7,035,050 B1
(45) Date of Patent: Apr. 25, 2006

(54) FLEXIBLE CIRCUIT LAMINATE SHUNT FOR DISK DRIVE SUSPENSIONS

(75) Inventor: Sivadasan Kulangara, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 480 days.

(21) Appl. No.: 10/189,884

(22) Filed: Jul. 2, 2002

Related U.S. Application Data

(60) Provisional application No. 60/385,762, filed on Jun. 3, 2002.

(51) Int. Cl.
*G11B 5/48* (2006.01)

(52) U.S. Cl. .................... 360/245.9; 360/323
(58) Field of Classification Search .......... 360/245.8, 360/245.9, 244.3, 323
See application file for complete search history.

(56) References Cited

U.S. PATENT DOCUMENTS 5,995,328 A * 11/1999 Balakrishnan .......... 360/245.9
6,163,443 A * 12/2000 Hatagami et al. ........... 360/323
6,847,505 B1 * 1/2005 Luo ..................... 360/245.8

FOREIGN PATENT DOCUMENTS

| JP | 07093950 A | * | 4/1995 |
| JP | 2000021157 A | * | 1/2000 |
| JP | 2000306220 A | * | 11/2000 |
| JP | 2001024291 A | * | 1/2001 |

* cited by examiner

*Primary Examiner*—William J Klimowicz
(74) *Attorney, Agent, or Firm*—Louis J. Bachand

(57) ABSTRACT

A disk drive suspension interconnect of a flexible conductive laminate with an electrically insulative layer and a pair of trace conductors supported thereon is shunted by having an insulative layer first portion supporting the trace conductors oppose a deflectable layer second portion free of the trace conductors and disposed beyond the first portion and carrying a shunt structure for connecting in parallel the trace conductors. The shunt structure conductive material is arranged on the second portion to contact in shunting relation the trace conductor pair in the deflected condition of the second portion and further has adhesive arranged thereon to secure the first portion in place.

29 Claims, 2 Drawing Sheets

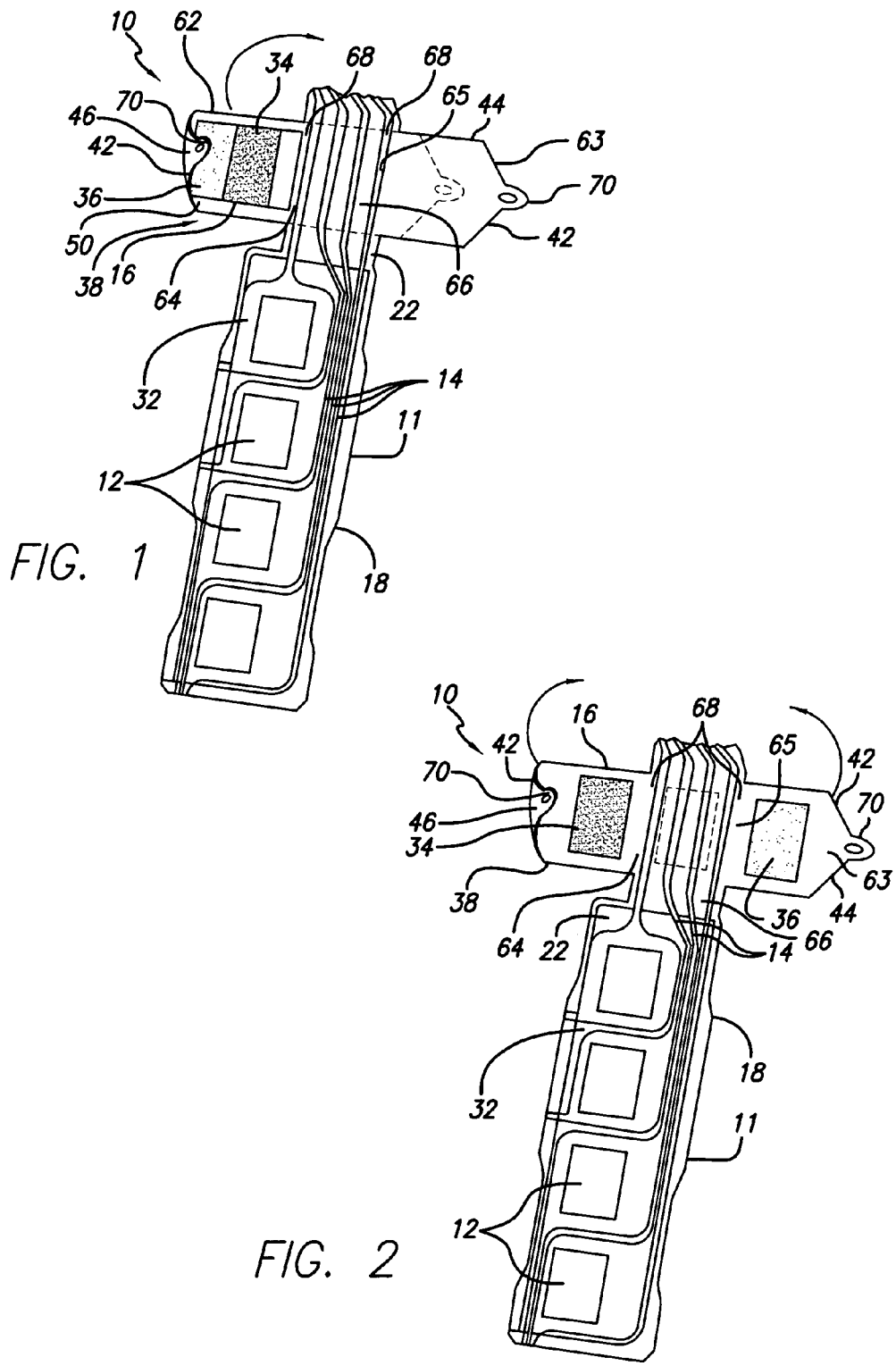

FLEXIBLE CIRCUIT LAMINATE SHUNT FOR DISK DRIVE SUSPENSIONS

REFERENCE TO RELATED APPLICATIONS

This application claims the benefit of U.S. Provisional Application Ser. No. 60/385,762, filed Jun. 3, 2002.

BACKGROUND OF THE INVENTION

1. Field of the Invention

This invention relates to disk drive suspensions, and more particularly to wireless disk drive suspension assemblies having a flexible conductive laminate forming the electrical connection between the slider, including the disk read write element/head, and the suspension signal electronics. In a particular aspect, the invention provides an improved shunt for protecting the read write head during suspension assembly operations. The shunt structure is reusable and comprises in one embodiment a conductive material shunt structure carried on a conductive trace-free portion of the laminate insulative layer, suitably with adjacent adhesive for separably bonding the shunt structure to a further laminate insulative layer portion such as that which supports the conductive traces, the conductive material and adhesive being arranged such that the shunt structure is in shunting contact with the laminate conductive traces.

2. Related Art

One of the major problems with wireless suspensions is the occurrence of spontaneous electrostatic discharges (ESD) through them when they are connected to magnetoresistive (MR) disk read elements/heads or giant magnetoresistive (GMR) element/heads. Any external charge poses a risk of traveling to the MR or GMR element. Thus a charge from a person or from an insulating surface charge build-up can flow via the trace/wire leads (or pads) to the slider/head and damage the MR sensor element, sometimes melting the sensor element. It takes as little as 15 volts for a GMR head to be damaged. One of the ways to prevent this phenomenon is to connect all the leads in parallel so that this current does not pass through the MR element. Designing a circuit with a shunt across the leads before the head is attached to the suspension will connect the leads in parallel. But, this solution only is effective when the assembly of the wireless conductor and MR or GMR is in other than a test or operating condition. In a test or operating situation, after the head/element is attached to the conductors/traces to be tested for reading and writing to disk, the presence of the shunt circuitry prevents testing and the shunt needs to be removed. The shunt is cut-off from the remainder of the circuit and it cannot be reattached; electrostatic discharge protection no longer exists for the affected part although more handling and testing is required.

In U.S. Pat. No. 6,351,352, assigned to the assignee of this application, the disclosure of which is incorporated herein by this reference, a form of separably adherent shunt and method was disclosed. The method included protecting a disk head from spontaneous electrostatic discharge current during the assembly but not during the actual testing operations of a disk drive suspension comprising a load beam and a flexible conductive laminate. The laminate had at least one pair of trace conductors connected to the magnetoresistive head. Adjacent portions of the trace conductors comprising each conductor pair were exposed, and there was applied to the exposed trace conductor portions a separably adherent shunt structure to temporarily connect each the pair of trace conductors in parallel while there was a potential for a spontaneous electrostatic discharge current reaching the disk head, such that the discharge currents were directed away from the head.

SUMMARY OF THE INVENTION

It is an object of the invention to provide apparatus and method for continuing shunt protection of wireless suspension assemblies. It is another object to provide a novel shunt structure formed from portions of the insulative layer of the flexible conductive laminate to be readily attached to and detached from the conductive traces or contact pads electrically connected to the traces as needed to protect the MR and GMR elements/heads. It is a further object to provide in an electrical disk drive suspension interconnect an integral shunt structure of conductive material and adhesive carried on a second portion, e.g. of the insulative layer or other web, that will connect the conductive traces in parallel. It is a still further object to provide a metal conductive material and adhesive combination patterned on a carrier formed from second portions of the laminate insulative layer, the portion being foldable over a first portion of the layer to oppose the first layer and upon deflection to contact the conductive trace pairs in shunting relation.

These and other objects of the invention to become apparent hereinafter are realized in a disk drive suspension interconnect comprising a flexible conductive laminate comprising an electrically insulative layer and a pair of trace conductors supported on the layer, the insulative layer having a first portion supporting the trace conductors and a second portion free of the trace conductors and disposed beyond the first portion, the second portion being adapted to be deflected to oppose the first portion, and a shunt structure for connecting in parallel the pair of trace conductors, the shunt structure comprising conductive material carried by the second portion and arranged to contact in shunting relation the trace conductor pair in the deflected condition of the second portion to oppose the first portion.

In this and like embodiments hereinafter described, typically, the shunt structure further comprises an adhesive disposed on the second portion for maintaining the second portion conductive material in shunting contact with the trace conductor pair, the adhesive is disposed adjacent the conductive material, e.g. in both the deflected and undeflected conditions of the second portion, or in the deflected but not the undeflected condition of the second portion.

In a further embodiment, the invention provides a disk drive suspension interconnect comprising a flexible conductive laminate comprising an electrically insulative layer, a pair of trace conductors supported on the layer, and a contact pad electrically connected to the trace conductor pair, the insulative layer having a first portion supporting the contact pad and a second portion free of the contact pad and the trace conductors, the second portion being disposed beyond the first portion and adapted to be deflected to oppose the first portion, and a shunt structure for connecting in parallel the pair of trace conductors, the shunt structure comprising conductive material carried by the second portion and arranged to contact in trace conductor shunting relation the contact pad in the deflected condition of the second portion to oppose the first portion.

In a further embodiment, the invention provides a disk drive suspension interconnect comprising a flexible conductive laminate comprising an electrically insulative layer and a pair of trace conductors supported on the layer, the insulative layer having a first portion supporting the trace conductors and a second portion free of the trace conductors and disposed beyond the first portion, the second portion being separate from the first portion and adapted to be deflected to oppose the first portion, and a shunt structure for connecting in parallel the pair of trace conductors, the shunt structure comprising conductive material carried by the second portion and arranged to contact in shunting relation the trace conductor pair in the deflected condition of the second portion to oppose the first portion.

In a still further embodiment, the invention provides a disk drive suspension interconnect comprising a flexible conductive laminate comprising an electrically insulative layer, a pair of trace conductors supported on the layer, and a contact pad electrically connected to the trace conductor pair, the insulative layer having a first portion supporting the contact pad and a second portion separate from the first portion and free of the contact pad and the trace conductors, the second portion being disposed beyond the first portion and adapted to be deflected to oppose the first portion, and a shunt structure for connecting in parallel the pair of trace conductors, the shunt structure comprising conductive material carried by the second portion and arranged to contact in trace conductor shunting relation the contact pad in the deflected condition of the second portion to oppose the first portion.

In a further embodiment, the invention provides a disk drive suspension interconnect comprising a flexible conductive laminate comprising an electrically insulative layer and a pair of trace conductors supported on the layer, the insulative layer having a first portion supporting the trace conductors and a second portion free of the trace conductors and disposed beyond the first portion, and a shunt structure for connecting in parallel the pair of trace conductors, the shunt structure comprising a carrier carrying conductive material arranged to contact in shunting relation the trace conductor pair and adhesive arranged to contact the second portion in adhering relation while the conductive material is contacting the trace conductor pair.

In a further embodiment, the invention provides a disk drive suspension interconnect comprising a flexible conductive laminate comprising an electrically insulative layer, a pair of trace conductors supported on the layer, and a contact pad electrically connected to the trace conductor pair, the insulative layer having a first portion supporting the contact pad and a second portion separate from the first portion and free of the contact pad and the trace conductors, and a shunt structure for connecting in parallel the pair of trace conductors, the shunt structure comprising a carrier and a conductive material carried thereby arranged to contact in trace conductor shunting relation the contact pad and an adhesive carried thereby arranged to bond the carrier to the second portion.

In these and like embodiments, typically, the second portion includes a first lateral extension at a lateral edge of the first portion, and the shunt structure comprises the conductive material carried on the same side of the second portion first lateral extension as the first portion carries the trace conductor pairs, the second portion being foldable at a fold line between the first lateral extension and the first portion over onto the first portion to carry the shunt structure conductive material to the trace conductor pair, the shunt structure further comprises adhesive disposed on the first lateral extension on the same side as the conductive material and arranged to contact the second portion adjacent the trace conductors, the first lateral extension terminates distally in a tab adapted for grasping to separate the first lateral extension from the first portion, the second portion includes first and second lateral extensions extending from opposite edges of the first portion, the shunt structure comprises the conductive material carried on the same side of at least one of the first and second lateral extensions as the first portion carries the trace conductor pairs, at least one of the first and second lateral extensions being foldable at a fold line between the lateral extensions and the first portion over onto the first portion to carry the shunt structure conductive material to the trace conductor pair, the shunt structure further comprises adhesive disposed on at least one of the first and second lateral extensions on the same side as the conductive material and arranged to contact the second portion adjacent the trace conductors, the first lateral extension carries the conductive material, the second lateral extension carries the adhesive, and the second lateral extension overlies the first lateral extension folded over onto the trace conductors in shunting relation adhesively bonding to the first lateral extension to maintain contact between the conductive material and the trace conductor pair, and at least one of the first and second lateral extensions terminate distally in a pull tab.

Further, in these and like embodiments, typically, the second portion includes a first lateral extension at a lateral edge of the first portion, and the shunt structure comprises the conductive material carried on the same side of the second portion first lateral extension as the first portion carries the trace conductor pairs, the second portion being foldable at a fold line between the first lateral extension and the first portion over onto the first portion to carry the shunt structure conductive material to the trace conductor pair, the second portion includes a first lateral extension at a first lateral edge of the first portion and a second lateral extension opposite the first lateral extension and at a second lateral edge of the first portion, the shunt structure comprising the conductive material carried on the same side of the second portion first lateral extension as the first portion carries the trace conductor pairs, the second portion first lateral extension being foldable at a fold line between the first lateral extension and the first portion over onto the first portion to carry the shunt structure conductive material to the trace conductor pair, the second portion second lateral extension carrying an adhesive arranged to bond the second lateral portion in folded condition onto the folded first lateral extension to retain the first lateral extension-carried conductive material in shunting contact with the trace conductor pair.

In a further embodiment, the invention provides a disk drive suspension interconnect comprising a flexible conductive laminate comprising an electrically insulative layer and a pair of trace conductors supported on said layer, the insulative layer having a first portion supporting the trace conductors and including a contact pad electrically connected to the trace conductor pair and a second portion beyond the first portion and carrying a contact pad, the second portion being foldable onto the first portion trace conductor shunting relation.

In its method aspects, the invention provides a method of making a disk drive suspension interconnect with an integral shunt structure, the interconnect comprising a flexible conductive laminate of an electrically insulative layer and a pair of trace conductors supported on the layer, including defining in the insulative layer a first portion supporting the trace conductors, defining in the insulative layer a second portion free of the trace conductors, maintaining the second portion beyond the first portion and able to be deflected onto the first portion, and providing on the second portion a shunt structure comprising conductive material arranged for connecting in parallel the pair of trace conductors in the deflected condition of the second portion.

In this and like embodiments, typically, the method also includes maintaining on the second portion an adhesive for maintaining the second portion conductive material in shunting contact with the trace conductor pair, maintaining the adhesive disposed adjacent the conductive material on the second portion, maintaining the adhesive adjacent the conductive material in the deflected and undeflected conditions of the second portion, or in the deflected but not the undeflected condition of the second portion.

In a further embodiment, the invention provides a method of making a disk drive suspension interconnect with an integral shunt structure, the interconnect comprising a flexible conductive laminate comprising an electrically insulative layer, a pair of trace conductors supported on the layer, and a contact pad electrically connected to the trace conductor pair, including defining in the insulative layer a first portion supporting the contact pad, defining in the insulative layer a second portion beyond the first portion and free of the contact pad and the trace conductors, the second portion being deflectable to oppose the first portion, and providing a shunt structure comprising conductive material disposed on the second portion for contacting the contact pad to connect in parallel the pair of trace conductors in shunting relation in the deflected condition of the second portion.

In a further embodiment, the invention provides that method of making a disk drive suspension interconnect comprising a flexible conductive laminate of an electrically insulative layer, a pair of trace conductors supported on the layer, and a contact pad electrically connected to the trace conductor pair, including defining in the insulative layer a first portion supporting the contact pad, defining a second portion separate from the first portion and free of the contact pad and the trace conductors and disposed beyond the first portion, the second portion being deflectable to oppose the first portion, and providing a shunt structure comprising conductive material carried by the second portion and arranged for connecting in parallel the pair of trace conductors through the contact pad in the deflected condition of the second portion.

In a further embodiment, the invention provides a method of shunting a disk drive suspension interconnect comprising a flexible conductive laminate of an electrically insulative layer and a pair of trace conductors supported on the layer, including defining in the insulative layer a first portion supporting the trace conductors, defining in the insulative layer a second portion free of the trace conductors, maintaining the second portion beyond the first portion, providing on the second portion a shunt structure comprising conductive material and adhesive arranged for connecting in parallel the pair of trace conductors upon a deflection of the second portion into contact with the first portion, and deflecting the second portion to contact the shunt structure across the trace conductors in shunting relation.

In yet another method embodiment, the invention provides the method of shunting a disk drive suspension interconnect with an integral shunt structure, the interconnect comprising a flexible conductive laminate comprising an electrically insulative layer, a pair of trace conductors supported on the layer, and a contact pad electrically connected to the trace conductor pair, including defining in the insulative layer a first portion supporting the contact pad, defining in the insulative layer a second portion beyond the first portion and free of the contact pad and the trace conductors, providing a shunt structure comprising conductive material and adhesive disposed on the second portion for contacting the contact pad to connect in parallel the pair of trace conductors, and deflecting the second portion into the first portion in trace conductor shunting relation.

The invention further provides the method of shunting a disk drive suspension interconnect comprising a flexible conductive laminate of an electrically insulative layer, a pair of trace conductors supported on the layer, and a contact pad electrically connected to the trace conductor pair, including defining in the insulative layer a first portion supporting the contact pad, defining a second portion separate from the first portion and free of the contact pad and the trace conductors and disposed beyond the first portion, providing a shunt structure comprising conductive material and adhesive carried by the second portion and arranged for connecting in parallel the pair of trace conductors through the contact pad upon deflection of the second portion into the first portion, and deflecting the second portion into the first portion.

BRIEF DESCRIPTION OF THE DRAWINGS

The invention will be further described in conjunction with the attached drawings in which:

FIG. 1 is a plan view of a disk drive suspension electrical interconnect having the shunt structure of the invention;

FIG. 2 is a view like FIG. 1 of a further embodiment; and,

DETAILED DESCRIPTION

Figure 3:
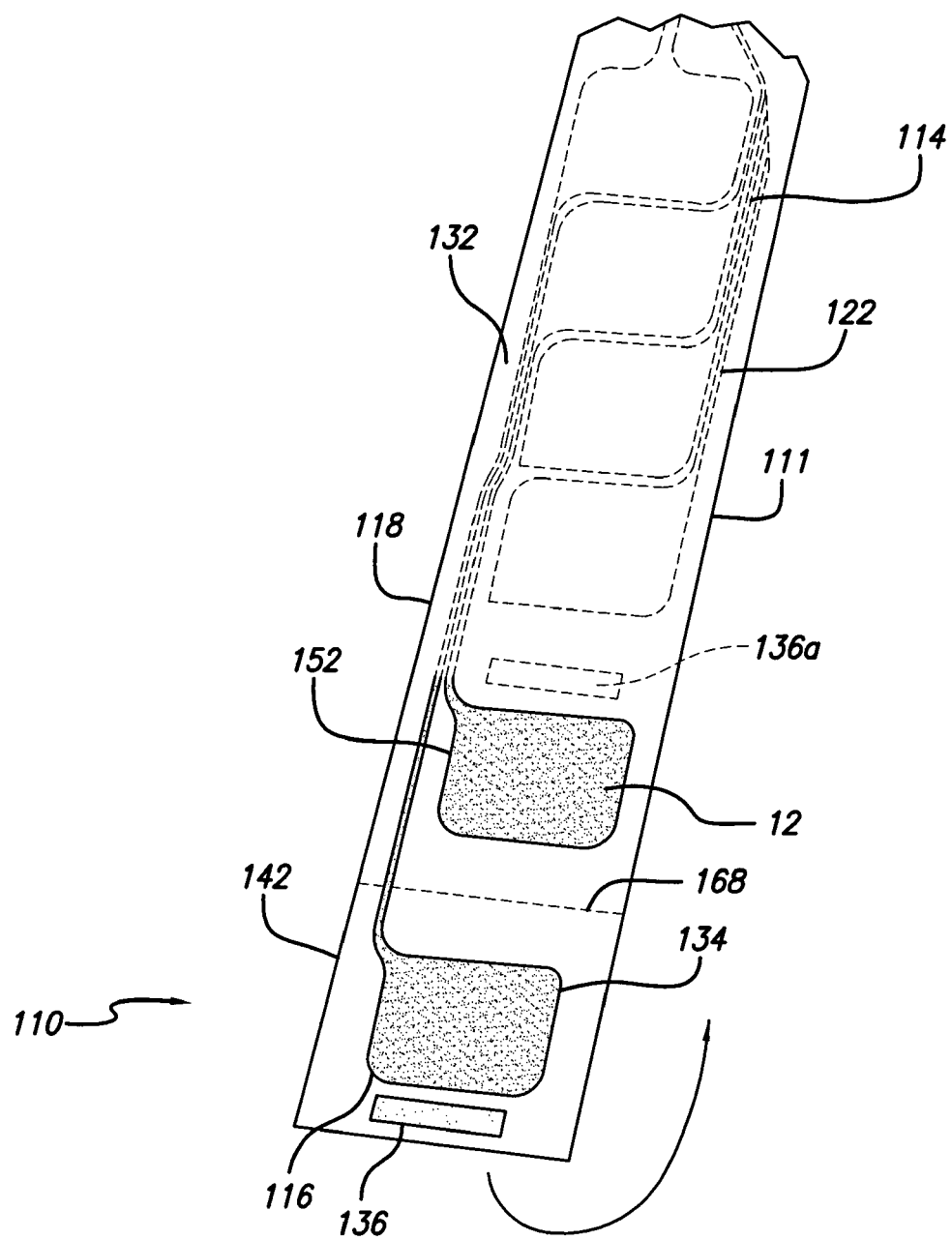
FIG. 3 is a view like FIG. 1 of a further embodiment.

In the assembly of a disk drive suspension, a slider containing read and/or write heads is attached to a load beam and an electrical interconnect comprising a wireless conductor of a laminate of an electrically insulative layer suitably of plastic and single or multiple trace conductor pairs, e.g. a read pair and a write pair, and in some case a metal layer. The slider is attached to the suspension load beam usually at the tongue of a flexure that is attached to the load beam. Then electrical connections between the head and the conductive trace leads are established by either ultrasonically bonding the leads to the read/write head pads or bonding the pads from the lead and the head using a gold ball (pressure and heat). At this stage, the leads are shorted using an integrally formed shunt. Then the head is tested number of times to determine its electrical performance. To do this, even before the first test the shunt must be sheared off at head gimbal assembly (HGA) level. This is an irreversible step and one that exposes the copper traces. Until the shearing operation the copper was completely covered by solder mask, solder, or gold planting so that the reactive copper was protected.

To protect the leads use has been made of a clip, sometimes referred to as a "crow bar", to shunt the leads together. In operation, the clip is similar to a paper clip. Disadvantages of its use excessive bulk, a penchant for damaging the contact pads during clamping, changing or even damaging the suspension from its own weight (pendulum effect), and likelihood of snagging on something during handling.

The present invention provides a better shunt, one that uses the insulative layer of the conductor laminate to form a shunt structure comprising a conductive material deposited on a portion of the insulative layer that is not directly supporting the trace conductors; this portion is then folded onto the trace carrying layer portion adjacent and secured there as needed with adhesive that is also deposited onto the foldable portion. A typical shunt structure will be a conductive material with an electrical conductivity of approximately 1000 ohms per square. Bond pads, contact pads and like structures referred to herein are separate conductive structures to which the leads are attached, or can be portions of the leads themselves. The terms pad or contact pad thus refer to both exposed, noninsulated portions of the trace conductors and to structures separate from the flexible conductive laminate, carried on the load beam for example, used to effect an electrical connection between a trace conductor and other device electronics. The shunt structure of the conductive material on the light, flexible insulative layer can be applied to the pads without clamps or any substantial force likely to damage the suspension, and can be taken off by applying only a small force. The shunt structure of the invention can have a projecting tab to facilitate manipulation. The several shunt structure variations mentioned herein above and described hereinafter, are an improvement over the prior art in greatly reducing or eliminating the time of exposure of the wireless conductor to conditions that may result in ESD damage.

The electrical interconnect of the invention as noted is used in a disk drive suspension that comprises a load beam having a base portion, a spring portion, and a rigid portion carrying a flexure. A mounting plate secures the load beam to an actuator arm. Electrical contact pads connect the suspension electronics to the slider attached to the flexure tongue via the trace conductors of the interconnect extending between the slider and the contact pads.

With reference to FIG. 1, the invention is particularly concerned with providing a shunt 10 across the electrical interconnect 11 comprising an electrical circuit including the contact pads 12 and the trace conductors 14. In a first embodiment of the invention shunt 10 comprises the shunt structure 16 for connecting in parallel at least one pair, and in general all pairs of the trace conductors 14. Trace conductors 14 typically comprise copper, including alloys of copper, and are the conductive portions of the flexible conductive laminate 18. Flexible conductive laminate 18 is known per se and typically comprises an insulative layer 22 on which the trace conductors 14 are formed, the conductive traces being either deposited on the dielectric layer 22 or constituting the remaining portions of a copper or other conductive layer that has been etched away, an optional cover layer (not shown) and an optional a metal layer (not shown) that is attached to the dielectric layer in spaced relation to the trace conductors.

In a typical assembly of a disk drive suspension the flexible conductive laminate 18 is connected as described above and as so connected is potentially subject to spontaneous electrostatic discharge currents deleterious to the head within the slider.

With further reference to FIG. 1, disk drive suspension interconnect 11 comprises the flexible conductive laminate 18 which in turn comprises an electrically insulative layer 22 and at least one pair of trace conductors 14 supported on the layer. Insulative layer 22 has a first portion 32 supporting the trace conductors 14 and a second portion 42 free of the trace conductors and disposed beyond the first portion. The insulative layer second portion 42 is, as shown, adapted to be deflected to oppose the first portion 32, and carries shunt structure 16 for connecting in parallel the pair of trace conductors 14. Shunt structure 16 comprises conductive material 34 carried on the left hand section 38 of the second portion 42 and arranged to contact in shunting relation the trace conductor 14 pair in the deflected condition of the second portion in which the second portion is folded over as shown in dotted outline to oppose the first portion 32.

In the embodiment shown, the shunt structure 16 further comprises an adhesive 36 also disposed on the left hand section 38 of the second portion 42 for maintaining the second portion conductive material 34 in shunting contact with the trace conductor 14 pair. Adhesive 36 is disposed adjacent the conductive material 34, e.g. in both the deflected and undeflected conditions of the second portion, see FIG. 1, or in the deflected but not the undeflected condition of the second portion, see FIG. 2, where the right hand section 44 of the second portion 42 carries the adhesive 36 so that after folding the first section 38 over the trace conductors 14, to have shunting contact between the conductive material 34 and the trace conductors, the second section 44 is also folded over to oppose and to cover at least in part the outer or upper face 46 of the first section 38 of the second portion 42.

In a further embodiment, a portion 42 of the insulative layer or another sheet or film material defines a carrier for the shunting material 34 and the adhesive 36.

Insulative layer second portion 42 is shown in FIGS. 1 and 2 to comprise a first section 38 defining a first lateral extension 62 at a lateral edge 64 of the first portion 32. Shunt structure 16 comprises the conductive material 34 carried on the same side 50 of the second portion first lateral extension 62 as the first portion side 66 carries the trace conductor pairs 14.

With reference to FIG. 2, the second portion 42 is foldable at a fold line 68 at the lateral edge 65 between the second lateral extension 63 and the first portion 32 over onto the first portion to hold the shunt structure conductive material 34 at the trace conductor pair 14. In this embodiment, the shunt structure 16 further comprises adhesive 36 disposed on the second lateral extension 63 on the same side of the insulative layer as carries the conductors 14 and 66 and as the conductive material 34 is carried; arranged to contact the first portion 32 adjacent the trace conductors 14. The first and second lateral extensions 62, 63 terminate distally in a tab or point 70 adapted for grasping to separate the lateral extensions from the first portion 32.

The second portion 42 includes first and second lateral extensions 62, 63 extending from opposite edges 64, 65 of the first portion, and the shunt structure 16 comprises the conductive material 34 carried on the same side 66 of at least one of the first and second lateral extensions as the first portion 32 carries the trace conductor pairs 14. At least one of the first and second lateral extensions 62, 63 is foldable at fold line 68, e.g. between the lateral extensions and the first portion 32 over onto the first portion to carry the shunt structure conductive material 34 to the trace conductor pair 12.

As best shown in FIG. 2, the shunt structure 16 further comprises adhesive 36 disposed on at least one of the first and second lateral extensions 62, 63 on the same side 66 as the conductive material 34 and arranged to contact the second portion 42 adjacent the trace conductors 14. The first lateral extension 62 carries the conductive material 34, the second lateral extension 63 carries the adhesive 36, and the second lateral extension overlies the first lateral extension folded over onto the trace conductors 12 in shunting relation adhesively bonding to the first lateral extension to maintain contact between the conductive material and the trace conductor pair. Further, at least one of the first and second lateral extensions 62, 63 has a distal pull tab 70.

With reference to FIG. 3, the invention disk drive suspension 110 interconnect 111 comprises the flexible conductive laminate 118 having an electrically insulative layer 122, a pair of trace conductors 114 supported on the layer, and a contact pad 152 electrically connected to the trace conductor pair. Insulative layer 122 has a first portion 132 supporting the contact pad 152 and a second portion 142 free of the contact pad 152 and the trace conductors 114. Insulative layer second portion 142 is disposed beyond the first portion 132 and adapted to be deflected to oppose the first portion. Shunt structure 116 connects in parallel the pair of trace conductors 114, comprising conductive material 134 carried by the second portion 142 and arranged to contact in trace conductor shunting relation the contact pad 152 in the deflected condition of the second portion, folded at 168, so that it opposes the first portion 132.

The second portion 142 can be separated from the first portion 132 while being adapted to be deflected to oppose the first portion and carry the shunt structure 116 for connecting in parallel the pair of trace conductors 114.

Further, in the embodiment of FIG. 3 where a contact pad 152 connects the traces 114, the insulative layer 122 has first portion 132 supporting the contact pad and second portion 142, formed or otherwise separate from the first portion and free of the contact pad and the trace conductors 114. Second portion 142 is disposed beyond the first portion 132 and adapted to be deflected to oppose the first portion. Shunt structure 116 is provided for connecting in parallel the pair of trace conductors 114. Shunt structure 116 comprises conductive material 134 carried by the second portion 142 and arranged to contact in trace conductor shunting relation the contact pad 152 in the deflected condition of the second portion, adhered with adhesive 136, as indicated in dotted outline at 136a.

The invention method of making a disk drive suspension 10 interconnect 11 with an integral shunt structure 16, where the interconnect comprises a flexible conductive laminate 18 of an electrically insulative layer 22 and a pair of trace conductors 14 supported on the layer, includes defining in the insulative layer a first portion 32 supporting the trace conductors, defining in the insulative layer a second portion 42 free of the trace conductors, maintaining the second portion beyond the first portion and able to be deflected onto the first portion, and providing on the second portion a shunt structure 16 comprising conductive material 34 arranged for connecting in parallel the pair of trace conductors in the deflected condition of the second portion.

The invention method further includes maintaining on the second portion 42 an adhesive 36 for maintaining the second portion conductive material 34 in shunting contact with the trace conductor 14 pair, maintaining the adhesive disposed adjacent the conductive material on the second portion 42, maintaining the adhesive adjacent the conductive material in the deflected and undeflected conditions of the second portion, or in the deflected but not the undeflected condition of the second portion.

In another method embodiment, the method of shunting a disk drive suspension 110 interconnect 111 with an integral shunt structure 116 is provided, including, where the interconnect comprises a flexible conductive laminate 118 comprising an electrically insulative layer 122, a pair of trace conductors 114 supported on the layer, and a contact pad 152 electrically connected to the trace conductor pair, defining in the insulative layer a first portion 132 supporting the contact pad, defining in the insulative layer a second portion 142 beyond the first portion and free of the contact pad and the trace conductors, providing a shunt structure 116 comprising conductive material 134 and adhesive 136 disposed on the second portion for contacting the contact pad to connect in parallel the pair of trace conductors, and deflecting the second portion into the first portion in trace conductor shunting relation.

The invention thus provides apparatus and method for continuing shunt protection of wireless suspension assemblies, including a novel shunt structure formed from portions of the insulative layer of the flexible conductive laminate to be readily attached to and detached from the conductive traces or contact pads electrically connected to the traces as needed to protect the MR and GMR elements/heads. The invention further provides in an electrical disk drive suspension interconnect an integral shunt structure of conductive material and adhesive carried on a second portion, e.g. of the insulative layer or other web, that will connect the conductive traces in parallel, and provide a metal conductive material and adhesive combination patterned on a carrier formed from second portions of the laminate insulative layer, the portion being foldable over a first portion of the layer to oppose the first layer and upon deflection to contact the conductive trace pairs in shunting relation.

The foregoing objects are thus met.

I claim:

1. A disk drive suspension interconnect comprising a flexible conductive laminate comprising an electrically insulative layer and a pair of trace conductors supported on said layer, said insulative layer having a first portion supporting said trace conductors and a second portion free of said trace conductors and disposed beyond said first portion, said second portion being adapted to be deflected to oppose said first portion, and a shunt structure for connecting in parallel said pair of trace conductors, said shunt structure comprising conductive material carried by said second portion, said second portion being arranged to separably bondably maintain shunting contact of said shunting structure with said trace conductor pair in the deflected condition of said second portion to oppose said first portion.

2. The disk drive suspension interconnect according to claim 1, in which said second portion includes a first lateral extension at a lateral edge of said first portion, and said shunt structure comprises said conductive material carried on the same side of said second portion first lateral extension as said first portion carries said trace conductor pairs, said second portion being foldable at a fold line between said first lateral extension and said first portion over onto said first portion to carry said shunt structure conductive material to said trace conductor pair.

3. The disk drive suspension interconnect according to claim 2, in which said shunt structure further comprises adhesive disposed on said first lateral extension on the same side as said conductive material and arranged to contact said second portion adjacent said trace conductors.

4. The disk drive suspension interconnect according to claim 2, in which said first lateral extension terminates distally in a tab adapted for grasping to separate said first lateral extension from said first portion.

5. The disk drive suspension interconnect according to claim 1, in which said second portion includes first and second lateral extensions extending from opposite edges of said first portion, said shunt structure comprises said conductive material carried on the same side of at least one of said first and second lateral extensions as said first portion carries said trace conductor pairs, at least one of said first and second lateral extensions being foldable at a fold line between said lateral extensions and said first portion over onto said first portion to carry said shunt structure conductive material to said trace conductor pair.

6. The disk drive suspension interconnect according to claim 5, in which said shunt structure further comprises adhesive disposed on at least one of said first and second lateral extensions on the same side as said conductive material and arranged to contact said second portion adjacent said trace conductors.

7. The disk drive interconnect according to claim 6, in which said first lateral extension carries said conductive material, said second lateral extension carries said adhesive, and said second lateral extension overlies said first lateral extension folded over onto said trace conductors in shunting relation adhesively bonding to said first lateral extension to maintain contact between said conductive material and said trace conductor pair.

8. The disk drive suspension interconnect according to claim 7, in which at least one of said first and second lateral extensions terminate distally in a pull tab.

9. The disk drive suspension interconnect according to claim 1, in which said second portion includes a first lateral extension at a lateral edge of said first portion, and said shunt structure comprises said conductive material carried on the same side of said second portion first lateral extension as said first portion carries said trace conductor pairs, said second portion being foldable at a fold line between said first lateral extension and said first portion over onto said first portion to carry said shunt structure conductive material to said trace conductor pair.

10. The disk drive suspension interconnect according to claim 1, in which said second portion includes a first lateral extension at a first lateral edge of said first portion and a second lateral extension opposite said first lateral extension and at a second lateral edge of said first portion, said shunt structure comprising said conductive material carried on the same side of said second portion first lateral extension as said first portion carries said trace conductor pairs, said second portion first lateral extension being foldable at a fold line between said first lateral extension and said first portion over onto said first portion to carry said shunt structure conductive material to said trace conductor pair, said second portion second lateral extension carrying an adhesive arranged to bond said second lateral portion in folded condition onto said folded first lateral extension to retain said first lateral extension-carried conductive material in shunting contact with said trace conductor pair.

11. A disk drive suspension interconnect comprising a flexible conductive laminate comprising an electrically insulative layer and a pair of trace conductors supported on said layer, said insulative layer having a first portion supporting said trace conductors and a second portion free of said trace conductors and disposed beyond said first portion, said second portion being adapted to be deflected to oppose said first portion, and a shunt structure for connecting in parallel said pair of trace conductors, said shunt structure comprising conductive material carried by said second portion and an adhesive disposed on said second portion for maintaining said second portion conductive material in shunting contact with said trace conductor pair in shunting relation in the deflected condition of said second portion to oppose said first portion.

12. The disk drive suspension interconnect according to claim 11, in which said adhesive is disposed adjacent said conductive material.

13. The disk drive suspension interconnect according to claim 12, in which said adhesive is disposed adjacent said conductive material in the deflected and undeflected conditions of said second portion.

14. The disk drive suspension interconnect according to claim 12, in which said adhesive is disposed adjacent said conductive material in the deflected but not the undeflected condition of said second portion.

15. Disk drive suspension interconnect comprising a flexible conductive laminate comprising an electrically insulative layer and a pair of trace conductors supported on said layer, said insulative layer having a first portion supporting said trace conductors and a second portion free of said trace conductors and disposed beyond said first portion, said second portion being arranged to be deflected to oppose and separably bond to said first portion, and a shunt structure for connecting in parallel said pair of trace conductors, said shunt structure comprising conductive material carried by said second portion to contact in shunting relation said trace conductor pair in the deflected condition of said second portion to oppose said first portion.

16. A disk drive suspension interconnect comprising a flexible conductive laminate comprising an electrically insulative layer and a pair of trace conductors supported on said layer, said insulative layer having a first portion supporting said trace conductors and a second portion free of said trace conductors and disposed beyond said first portion, said second portion being separate from said first portion and adapted to be deflected to oppose said first portion, and a shunt structure for connecting in parallel said pair of trace conductors, said shunt structure comprising conductive material carried by said second portion and arranged to contact in shunting relation said trace conductor pair in the deflected condition of said second portion to oppose said first portion and an adhesive disposed on said second portion for maintaining said second portion conductive material in shunting contact with said trace conductor pair.

17. The disk drive suspension interconnect according to claim 16, in which said adhesive is disposed adjacent said conductive material.

18. The disk drive suspension interconnect according to claim 16, in which said adhesive is disposed adjacent said conductive material in the deflected and undeflected conditions of said second portion.

19. The disk drive suspension interconnect according to claim 16, in which said adhesive is disposed adjacent said conductive material in the deflected but not the undeflected condition of said second portion.

20. Disk drive suspension interconnect comprising a flexible conductive laminate comprising an electrically insulative layer and a pair of trace conductors supported on said layer, said insulative layer having a first portion supporting said trace conductors and a second portion free of said trace conductors and disposed beyond said first portion, and a shunt structure for connecting in parallel said pair of trace conductors, said shunt structure comprising a carrier carrying conductive material arranged to contact in shunting relation said trace conductor pair and adhesive arranged to contact said second portion in adhering relation while said conductive material is contacting said trace conductor pair.

21. The disk drive suspension interconnect according to claim 20, in which said adhesive is disposed adjacent said conductive material.

22. The disk drive suspension interconnect according to claim 20, in which said adhesive is disposed adjacent said conductive material in the contacted and uncontacted conditions of said carrier with said trace conductor pair.

23. The disk drive suspension interconnect according to claim 20, in which said adhesive is disposed adjacent said conductive material in the contacted but not the uncontacted condition of said carrier.

24. A method of making a disk drive suspension interconnect with an integral shunt structure, said interconnect comprising a flexible conductive laminate of an electrically insulative layer and a pair of trace conductors supported on said layer, including defining in said insulative layer a first portion supporting said trace conductors, defining in said insulative layer a second portion free of said trace conductors, maintaining said second portion beyond said first portion and able to be deflected onto said first portion, providing on said second portion a shunt structure comprising conductive material arranged for connecting in parallel said pair of trace conductors in the deflected condition of said second portion, and separably bonding said second portion to said first portion to maintain the deflected condition of said second portion onto said first portion.

25. A method of making a disk drive suspension interconnect with an integral shunt structure, said interconnect comprising a flexible conductive laminate of an electrically insulative layer and a pair of trace conductors supported on said layer, including defining in said insulative layer a first portion supporting said trace conductors, defining in said insulative layer a second portion free of said trace conductors, maintaining said second portion beyond said first portion and able to be deflected onto said first portion, providing on said second portion a shunt structure comprising conductive material arranged for connecting in parallel said pair of trace conductors in the deflected condition of said second portion, and maintaining on said second portion an adhesive for maintaining said second portion conductive material in shunting contact with said trace conductor pair.

26. The method according to claim 25, including also maintaining said adhesive disposed adjacent said conductive material on said second portion.

27. The method according to claim 26, including also maintaining said adhesive adjacent said conductive material in the deflected and undeflected conditions of said second portion.

28. The method according to claim 26, including also maintaining said adhesive is disposed adjacent said conductive material in the deflected but not the undeflected condition of said second portion.

29. A method of shunting a disk drive suspension interconnect comprising a flexible conductive laminate of an electrically insulative layer and a pair of trace conductors supported on said layer, including defining in said insulative layer a first portion supporting said trace conductors, defining in said insulative layer a second portion free of said trace conductors, maintaining said second portion beyond said first portion, providing on said second portion a shunt structure comprising conductive material and adhesive arranged for connecting in parallel said pair of trace conductors upon a deflection of said second portion into contact with said first portion, and deflecting said second portion to contact said shunt structure across said trace conductors in shunting relation.

* * * * *